US006388438B1

(12) United States Patent
Raposa et al.

(10) Patent No.: US 6,388,438 B1
(45) Date of Patent: May 14, 2002

(54) SPEED SENSING CIRCUIT FOR UNDERWATER PROJECTILES

(75) Inventors: John R. Raposa; Daniel P. Thivierge, both of Warren, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/565,235

(22) Filed: Apr. 28, 2000

(51) Int. Cl.[7] ............................... G01P 3/66; G01P 3/80

(52) U.S. Cl. ........................................ 324/178; 73/167

(58) Field of Search ................................. 324/178, 179, 324/180; 73/167

(56) References Cited

U.S. PATENT DOCUMENTS 3,493,856 A  *  2/1970  Wilson ........................ 324/180

* cited by examiner

Primary Examiner—Walter Snow
(74) Attorney, Agent, or Firm—Michael J. McGowan; James M. Kasischke; Prithvi C. Lall

(57) ABSTRACT

A system for sensing projectile velocity and position having a plurality of support members positioned in a path of said projectile. Each support member has an aperture with a resistive trace supported in the aperture. The resistive trace can be separated by the projectile's passage. A sensing circuit is joined to each resistive trace and provides a signal indicating separation of the resistive trace. This signal is provided to a logic circuit which provides a single signal indicating separation of each said resistive trace. A data acquisition system provides an output indicating said projectile velocity and position with respect to time.

12 Claims, 4 Drawing Sheets

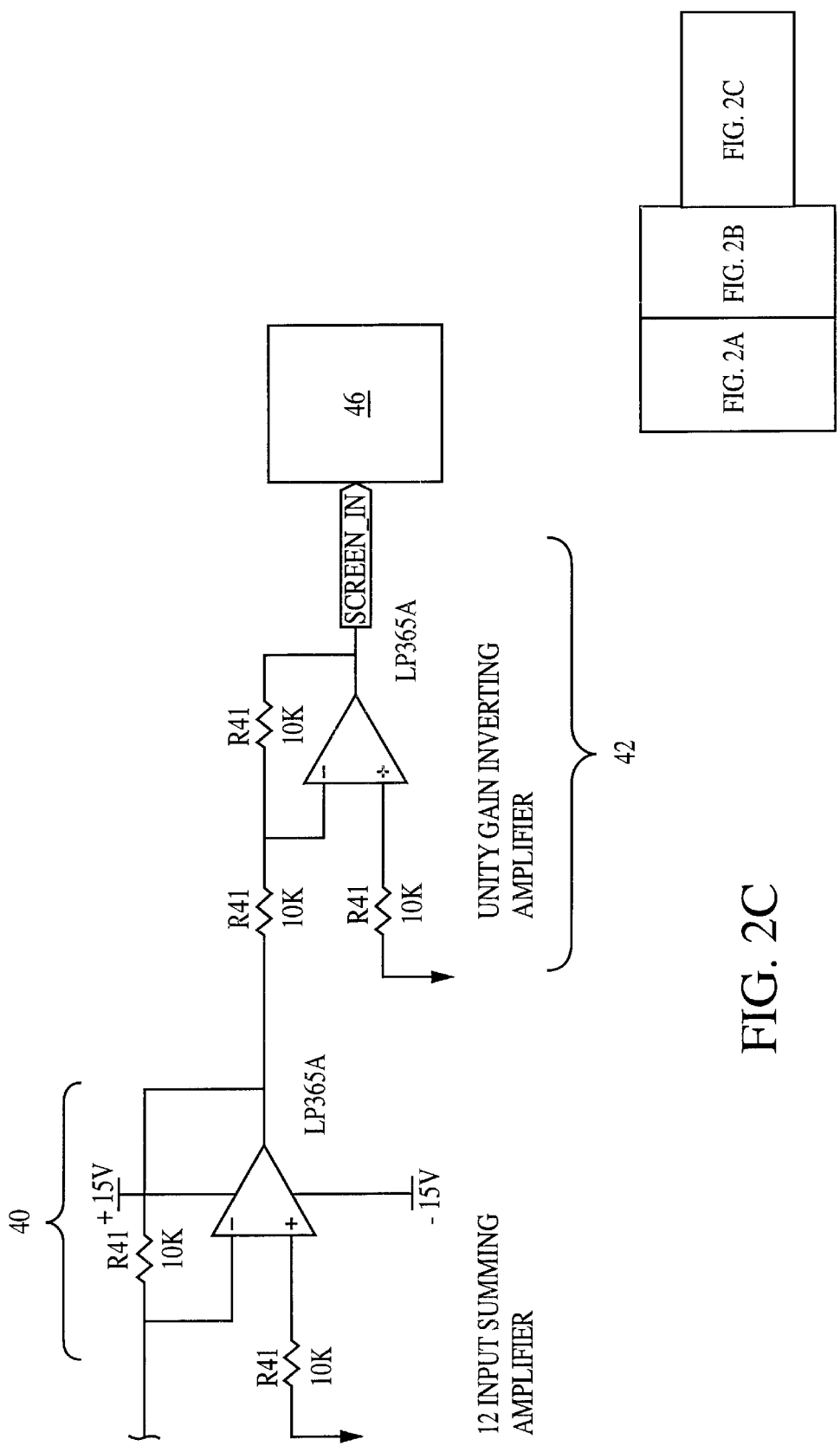

SPEED SENSING CIRCUIT FOR UNDERWATER PROJECTILES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a system for sensing the speed and time-position history of an underwater projectile, over the entire length of a run, for the Adaptable High Speed Underwater Munition (AHSUM) project. More particularly, the invention relates to a sensing circuit for providing a state output of a plurality of sensors used in the testing of an underwater projectile. The state output is used to determine a position and speed of the projectile during an entire run thereof through the plurality of screens.

(2) Description of the Prior Art

The known Adaptable High Speed Underwater Munition (AHSUM) project needed to record the speed and position of the projectile over the entire length of the underwater firing range. This provides valuable acceleration and deceleration data during the course of the test. Due to data acquisition channel limitations and a large number of sensors, a method was required to provide the speed and position data for the entire run over a single channel.

Thus, a problem exists in the art whereby there is a need for a sensing device which is able to sense both the speed and time position history of an underwater projectile over the entire length of a test range.

The following patents, for example, disclose various types of devices for determining projectile position and velocity, but do not disclose a device for sensing projectile velocity or time-position history using a sensing circuit according to the aspects of the present invention.

U.S. Pat. No. 4,147,055 to Wood et al.; and

U.S. Pat. No. 5,210,488 to McKeag.

Specifically, the patent to Wood et al. discloses an apparatus for measurement and correlation of chamber pressure and projectile position. The data is accomplished using an array of photo transistors, illuminated by collimated light, which photo transistors are sequentially switched off due to the interruption of the collimated light by the passing projectile. Pulses generated thereby may be displayed on an oscilloscope along with the pressure-time trace.

The patent to McKeag discloses a velocity measurement system for determining velocity of a launched projectile in a launch tube in an underwater environment. The system includes a transformer with secondary coils arranged in discrete groups with an increment of insulation shielding each of the groups of coils from the water therearound, the insulation increments being connectable to the projectile and being successively separable from the groups of secondary coils to expose such groups of coils successively to the water to short out such coils and reduce the voltage of the transformer secondary, and means for converting the speed of voltage reduction to the velocity of the projectile in the tube. In the case of launch of the projectile from a submarine, at least preprocessing of the voltage of the secondary is performed in the launch tube, and the preprocessed signal is passed to within the pressure hull of the submarine via a sealed electrical connector in the breech door of the launch tube to provide sub-safe conditions.

It should be understood that the present invention would in fact enhance the functionality of the above patents by providing a simplified device for sensing projectile velocity in an underwater environment.

SUMMARY OF THE INVENTION

Therefore it is an object of this invention to provide a device for sensing projectile velocity.

Another object of this invention is to provide a device for sensing projectile time-position history along with velocity in an underwater environment.

A still further object of the invention is to provide circuitry which is an accurate and inexpensive method to measure the velocity and time-position history of a projectile under the water.

Yet another object of this invention is to provide a device for sensing projectile velocity and time-position history in an underwater environment which is simple to manufacture and easy to use.

In accordance with one aspect of this invention, there is provided a system for sensing projectile velocity and position having a plurality of support members positioned in a path of said projectile. Each support member has an aperture with a resistive trace supported in the aperture. The resistive trace can be separated by the projectile's passage. A sensing circuit is joined to each resistive trace and provides a signal indicating separation of the resistive trace. This signal is provided to a logic circuit which provides a single signal indicating separation of each said resistive trace. A data acquisition system provides an output indicating said projectile velocity and position with respect to time.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to an apparatus for sensing a speed and time-position history of an underwater projectile, sensed over an entire length of a run for the adaptable high speed underwater munition (AHSUM) project.

Figure 1:
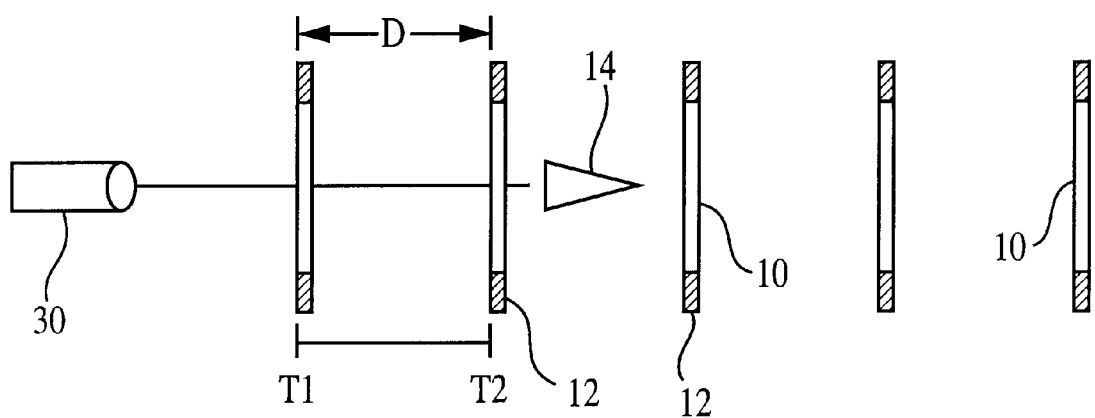
FIG. 1 is a side plan view of a first preferred embodiment of the present invention.
Figure 2A:
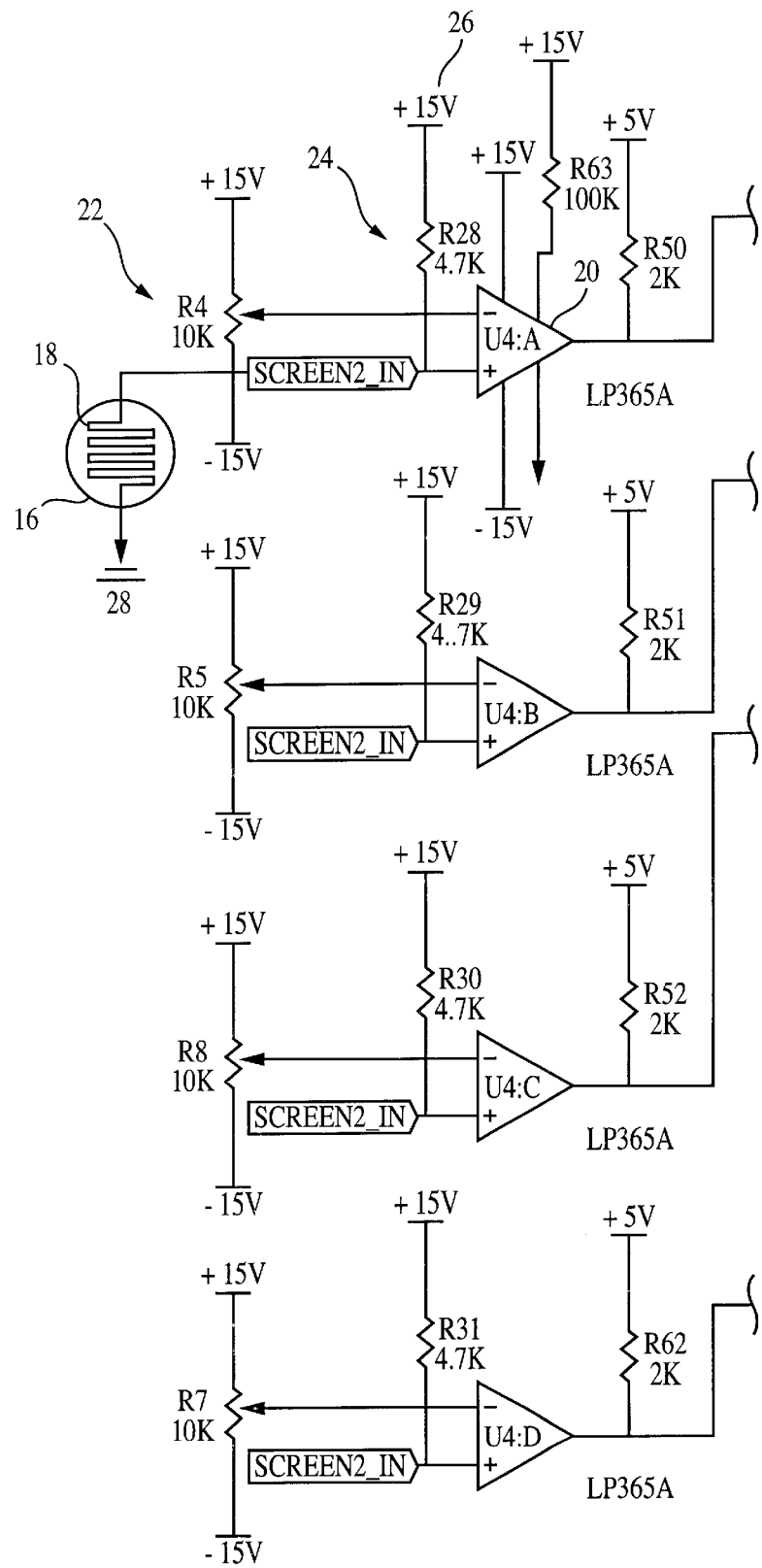
FIG. 2 is a diagrammatic view of the circuitry used in the preferred embodiment of the invention.
Figure 2B:
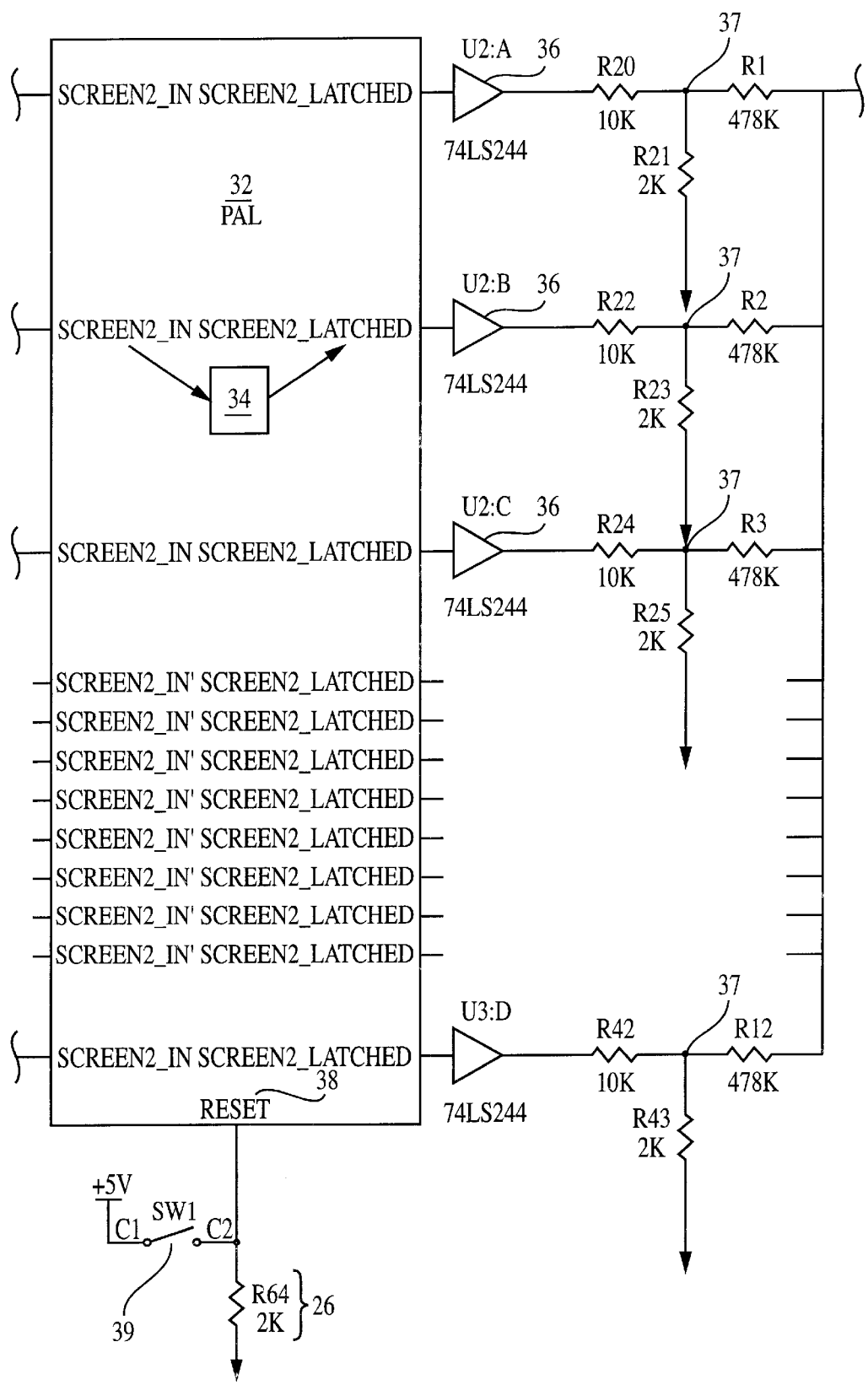

The testing utilizes both a break screen arrangement as shown in FIG. 1 and a sensing device used in connection with the break screens as shown more particularly in FIG. 2.

Referring first to FIG. 1, there is shown a plurality of break screen members 10. Each break screen 10 includes at least a support plate 12 having an opening formed therein for passage of a projectile 14 therethrough as discharged from a gun 30. The opening may be of any shape suitable for a clean passage of the projectile 14, however, a circular opening was utilized in actual testing of the device. The support plate 12 is typically made from steel because the steel plate 12 is not only used as a fastening surface for the break screen 10, but as a barricade to protect the surrounding facility and personnel in the event the projectile 14 strays off course.

The break screen 10 is further constructed of plastic sheets or film 16, similar to a transparency. A continuous resistive trace 18 winds its way back and forth across the flat surface of the film 16 and is sandwiched between two of the sheets of film 16. It is understood that alternative forms of capture and/or windings of the continuous resistive trace may be used in connection with one or more of the sheets of film 16, and such modifications are intended to be included within the scope of the invention. Both ends of the resistive trace are connected to the input of the control circuitry shown in further detail in FIG. 2 and described more fully in the following.

With regard to the arrangement shown in FIG. 1, the device for sensing projectile velocity preferably utilizes a plurality of break screens 10. In FIG. 1 there are a series of five break screens 10, all spaced a predetermined distance D apart. By shooting the projectile 14 through a series of break screens 10, set up along the full length of the underwater firing range, the test engineers can measure the time interval between the opening of consecutive screens 10 in order to measure velocity of the projectile 14 as well as a position of the projectile 14 during the run. The velocity of the projectile 14 is ultimately found by measuring the travel time (T2−T1) between two consecutive break screens 10 separated by a distance D.

By recording the speed and position of the projectile 14 over the entire length of the underwater firing range valuable acceleration and deceleration data is obtained during the course of the test. Due to data acquisition channel limitations and large number of break screens 10, a method was required to provide the speed and position data for the entire run over a single channel. Referring now more particularly to FIG. 2, it will be understood that the sensing and control circuitry processes the state of the plurality of break screens 10, and the following describes the circuit that was designed to accomplish this goal.

The circuitry described herein is able to receive and condition signals received from at least twelve break screens 10 evenly spaced in the underwater firing range. The resistance of each of the break screens 10 is approximately 1 Kohm before being broken by the projectile 14, and the resistance increases by a few orders of magnitude after being punctured. If the break screen 10 were in air, the resistance would be infinite (open circuit), but in water the resistance is lower due to the conductivity of the water.

One end of each resistance trace 18 is connected to circuit ground 28. The other end of each screen 10 is connected to a positive input of individual voltage comparator 20 circuits. The voltage comparator 20 can be any voltage comparator such as that manufactured by and identified as LP365A. A negative input of these voltage comparators 20 is connected to individual potentiometers 22 that are adjusted at a desired comparator transition voltage level (i.e., 10 V). The comparator transition voltage provides a threshold voltage at which an output of the comparator will change. A positive input of the comparator 20 is connected to a midpoint of a two-resistor voltage divider 24. The two resistor voltage divider 24 is made up of a fixed resistance pull-up resistor 26 (pulled up to positive 15VDC) and the resistive trace 18 connected to circuit ground 28. In this embodiment, the positive inputs to the comparators 20 (SCREEN_IN to SCREEN12_IN) will be approximately 2.36 VDC when the traces 18 are intact and will rise to between 14 and 15 VDC when the traces 10 are broken by the projectile 14. Comparators 20 and the other logic circuitry contained herein use a non-asserted or low state of 0VDC and an asserted or high state of 5 VDC. Once a trace 18 is broken and the positive input of the comparator 20 crosses the 10 VDC threshold, the output of the comparator 20 will change from a normally low state (0 VDC) to a high output state (5 VDC). Thus, while the trace 18 is intact, prior to impact by the projectile 14, the comparator 20 outputs a low signal. Immediately following impact of the projectile 14 on the trace 18, the trace 18 opens, thus opening a bottom half of the potentiometer voltage divider 22 allowing the positive input to the comparator 20 to be pulled high. This causes the comparator 20 to output a high signal (5VDC). The comparator output signal is input to a programmable array logic device 32 (PAL).

The PAL 32 is an integrated circuit that contains discrete logic devices that can be programmed and reconfigured. Each comparator 20 output signal is routed to the clock input of a D-flip-flop latch 34 programmed in the PAL 32. The D-input of each flip-flop 34 is permanently connected to a logically high input. The flip-flop 34 provides a latched high signal when the trace 18 is broken and prevents this latched output from changing in the event of variances at the output of the comparator 20.

The output of the flip-flops 34 are labeled SCREEN1_LATCHED through SCREEN12_LATCHED. The latched values can be cleared via an external logical high RESET pulse to the D-flip-flop reset input 38 that is generated by the activation of a manual switch 39. This reset input 38 is normally held low via a pull-down resistor 26. These latched signals are sent through buffers 36, such as 74LS244 buffers manufactured by Texas Instruments which provide the appropriate output drive current for the next stage of the circuit. The outputs of the buffers 36 are fed through resistor voltage dividers 37 made up of 10 Kohm and 2 Kohm resistors. These dividers 37 reduce the 5VDC buffer outputs to approximately 0.8VDC. The twelve resistor divider outputs are fed to the twelve 470 Kohm resistor inputs of a summing amplifier 40.

The output of the summing amplifier 40 is passed through a unity gain inverting amplifier 42 to cancel the inverting action of the summing amplifier 40 and to accommodate input characteristics of a data acquisition system 46. The data summing amplifier 40 receives a divided latched high signal from each D flip flop 34 for each of the break screen channels (output of the break screen). As the projectile 14 passes through successive break screens 10, the latched signals will be delayed in time. The output of this inverting amplifier 42 is called SCREEN_SUM. The SCREEN_SUM output is initially 0VDC but will increase in increments of approximately 0.8VDC as each of the successive screens 10 are broken. A time trace of this output resembles a staircase waveform. Each step of the waveform represents the breaking of a break screen 10. By simply measuring the time between steps on the waveform, a measurement of the time it takes the projectile 14 to travel between adjacent break screens 10 (T2−T1) is obtained. Knowing the distance D between the respective screens enables an accurate calculation of the speed and time history of the projectile. This process is repeated over the length of the entire run of break screens 10 in order to measure the speed of the projectile from the muzzle of the gun to the end of the test range. The outputs of the latches remain high until a reset signal is provided to the PAL 32 via an external manual switch 39 connected to a RESET input 38 of the PAL 32.

The above circuitry provides an accurate and inexpensive method to measure the velocity and time-position history of a projectile fired underwater. The circuitry only requires a single data acquisition channel to capture and record the state of multiple break screens located down the length of the firing range allowing for simplified calculation of the projectile velocity and acceleration/deceleration rates.

Alternatives to the embodiment shown include the use of a sensing coil around the plate instead of a break screen in order to sense the projectile passing through the plate. The projectile would be either constructed from magnetic material or have a magnetic insert.

Finally, it is anticipated that the invention herein will have far reaching applications other than those of underwater projectile testing projects.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A system for sensing projectile velocity and position comprising:
   a plurality of support members positionable in a path of said projectile, said support members having an aperture therein;
   a resistive trace supported in each support member aperture and being separable by passage of said projectile;
   a plurality of separate sensing circuits, each separate sensing circuit joined to one said resistive trace and providing a signal indicating separation of said resistive trace;
   a logic arrangement joined to said plurality of sensing circuits and providing a single signal indicating separation of each said resistive trace; and
   a data acquisition system joined to said logic arrangement and providing an output indicating said projectile velocity and position with respect to time.

2. The system according to claim 1 further comprising a plurality of penetrable sheets, each penetrable sheet being joined to one said support member across said support member aperture and supporting one said resistive trace.

3. The system according to claim 1 wherein each said sensing circuit includes:
   an electrical ground;
   a power source having a positive voltage terminal and a negative voltage terminal;
   a voltage comparator having positive and negative inputs and an output responsive to said positive and negative inputs;
   a potentiometer voltage divider joined between said positive voltage terminal and said negative voltage terminal connected to the negative input of said voltage comparator;
   a two resistor voltage divider joined between said positive voltage terminal and said electrical ground said resistive trace serving as one of said two resistors connected to the positive input of said voltage comparator; and
   a D-flip-flop having a d input joined to a logical high voltage, a clock input joined to said voltage comparator output and a flip-flop output providing a steady signal in response to said comparator output signal.

4. The system according to claim 3 wherein said logic arrangement comprises:
   a summing amplifier joined to receive output from each said D-flip-flop output receiving the reduced drive currents of said resistor dividers, and having an additive output providing a single signal indicating separation of said plurality of resistive traces; and
   a unity gain inverting amplifier joined to said summing amplifier additive output, and having an amplifier output joined to said data acquisition system and providing an output conditioned for receiving by said data acquisition system.

5. The system according to claim 4 wherein said logic arrangement further comprises a plurality of buffer members interposed between each D-flip-flop and said summing amplifier, each buffer member being joined to each D-flip-flop output and providing an output to said summing amplifier for providing a signal having a predetermined drive current to said summing amplifier.

6. The system according to claim 3 wherein said potentiometer voltage divider allows selection of a threshold voltage at which an output of said voltage comparator will change.

7. The system according to claim 3 wherein said D-flip-flops are embodied as programmed logic devices on a programmable array logic device.

8. A system for sensing projectile velocity and position comprising:
   a plurality of support members positionable in a path of said projectile, said support members having an aperture therein;
   a resistive trace supported in each support member aperture and being separable by passage of said projectile;
   a plurality of penetrable sheets, each penetrable sheet being joined to one said support member across said support member aperture and supporting one said resistive trace;
   a plurality of sensing circuits, each joined to one said resistive trace and providing a signal indicating separation of said resistive trace;
   said sensing circuit including:
      an electrical ground;
      a power source having a positive voltage terminal and a negative voltage terminal;
      a voltage comparator having positive and negative inputs and an output responsive to said positive and negative inputs;
      a potentiometer voltage divider joined between said positive voltage terminal and said negative voltage terminal connected to the negative input of said voltage comparator;
      a two resistor voltage divider joined between said positive voltage terminal and said electrical ground said resistive trace serving as one of said two resistors connected to the positive input of said voltage comparator; and
      a D-flip-flop having a d input joined to a logical high voltage, a clock input joined to said voltage comparator output and a flip-flop output providing a steady signal in response to said comparator output signal;
   a logic arrangement joined to said plurality of sensing circuits and providing a single signal indicating separation of each said resistive trace; and
   a data acquisition system joined to said logic arrangement and providing an output indicating said projectile velocity and position with respect to time.

9. The system according to claim 8 wherein said logic arrangement comprises:
   a summing amplifier joined to receive output from each said D-flip-flop output receiving the reduced drive currents of said resistor dividers, and having an additive output providing a single signal indicating separation of said plurality of resistive traces; and a unity gain inverting amplifier joined to said summing amplifier additive output, and having an amplifier output joined to said data acquisition system and providing an output conditioned for receiving by said data acquisition system.

10. The system according to claim 9 wherein said logic arrangement further comprises a plurality of buffer members interposed between each D-flip-flop and said summing amplifier, each buffer member being joined to each D-flip-flop output and providing an output to said summing amplifier for providing a signal having a predetermined drive current to said summing amplifier.

11. The system according to claim 8 wherein said potentiometer voltage divider allows selection of a threshold voltage at which an output of said voltage comparator will change.

12. The system according to claim 8 wherein said D-flip-flops are embodied as programmed logic devices on a programmable array logic device.

\* \* \* \* \*